United States Patent
Toh et al.

(10) Patent No.: US 8,384,014 B2
(45) Date of Patent: Feb. 26, 2013

(54) INTERPOLATION METHOD AND DEVICE FOR INCREASING THE RESOLUTION OF ENCODERS

(75) Inventors: Kheng Hin Toh, Paya Terubong (MY); Jin Kiong Ang, Bayan Lepas (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 328 days.

(21) Appl. No.: 12/913,175

(22) Filed: Oct. 27, 2010

(65) Prior Publication Data

US 2012/0104241 A1    May 3, 2012

(51) Int. Cl.
*G01D 5/34* (2006.01)
(52) U.S. Cl. .................................. 250/231.13
(58) Field of Classification Search ........ 250/231.13–231.18; 341/9, 13
See application file for complete search history.

(56) References Cited

U.S. PATENT DOCUMENTS

| | | | |
|---|---|---|---|
| 4,359,688 A * | 11/1982 | Haville | ........... 327/120 |
| 5,063,291 A | 11/1991 | Buehring | |
| 6,355,927 B1 | 3/2002 | Snyder | |
| 7,262,714 B2 | 8/2007 | Foo et al. | |
| 7,265,339 B1 | 9/2007 | Ng et al. | |

FOREIGN PATENT DOCUMENTS

JP          11051698          2/1999

* cited by examiner

*Primary Examiner* — Thanh Luu

(57) ABSTRACT

A method for interpolating an encoded signal of encoders is disclosed. The first step may include generating four first stage signals having a first frequency that are 45 degrees out of phase. The four signals may then be multiplied to obtain a plurality of second stage signals that are 90 degrees out of phase having a second frequency two times the first frequency. The second stage signals may then go through further computation to obtain a plurality of third stage signals that are 45 degrees out of phase. The third stage signals may be further adapted for further multiplication to obtain higher levels of interpolation. Interpolators and optical encoders characterized by the interpolation capability are also disclosed.

20 Claims, 12 Drawing Sheets

INTERPOLATION METHOD AND DEVICE FOR INCREASING THE RESOLUTION OF ENCODERS

BACKGROUND

Encoders are sensors for measuring absolute positions, or relative positions of a component in a system relative to a predetermined reference point. Encoders used to determine absolute position are known as absolute encoders. There are two major types of encoders, i.e. the magnetic encoders and optical encoders. Magnetic encoders work by sensing magnetic field, whereas optical encoders work by sensing changes of light. Generally, an optical encoder comprises a light source, a coding member, and a photo-detector allay. The coding member may be a code wheel configured to rotate about an axis at the center of the code wheel. Thus, encoders with code wheels are also known as rotary encoders. The coding member for linear encoders may be a linear code strip that is movable in a back and forth manner. Accordingly, encoders with a linear code strip are known as linear encoders.

Optical encoders may be divided further into transmissive optical encoders and reflective optical encoders. In the case of transmissive optical encoders, the light source is adapted to generate light that is then illuminated through light windows of the coding member towards the photo-detector array. In the case of a reflective optical encoder, the light source is adapted to generate light that is then reflected through the coding member onto the photo-detector array.

Encoders are widely used in in the field of industrial automation, such as robotics, automatic machines, or other machineries. However, encoders are also commonly used in consumer products, such as printers. In the case of printers, encoders may be used to measure movement of rollers or print heads of printers. Encoders may also be attached to rollers of electronic massage chairs. For industrial use, encoders may offer sensing and measuring capability, enabling closed-loop feedback in motor control systems or other actuators in robotics, automatic machines, or other machineries. Typically, encoders are used to measure distances of a few micrometers or less.

Resolutions of encoders are defined by minimum distance detectable by the encoder. Generally, resolutions of encoders may be determined by the pattern of the coding member and the size of the detectors. For example, the resolutions of optical encoders may be determined by the code strip patterns and the photo-detectors used to detect the light falling on the photo-detector array. One method for providing increased resolution is to utilize an interpolation scheme. Interpolation may be done by multiplying the output frequency. For example, an encoder that produces a full cycle of sine curve if interpolated eight times, may be able to produce eight full cycles of sine curve after 8× interpolation, traveling the same distance.

However, there may be challenges in interpolating signals generated in encoders, because the signals may be distorted due to wobbling of the coding members, misalignment of the coding member and the photo-detector, refraction and other optical properties of light that make the signal a non-ideal sine curve. In addition, the frequency of the signals generated by a single encoder may range from a low frequency, close to a stationary state, to a high speed of hundreds or even thousands of kilohertz. This makes designing an interpolator challenging and complicated, because it may not be easy to design a circuit that functions in precisely the same manner in a low frequency and a high frequency.

Interpolators may be integrated into optical encoders. Alternatively, interpolators may be available as separate, stand-alone devices. For example, in order to improve a motor system with existing working encoders, a designer may elect to utilize an interpolator to work with the existing encoders so that a higher resolution may be obtained.

BRIEF DESCRIPTION OF THE DRAWINGS

Illustrative embodiments by way of examples, not by way of limitation, are illustrated in the drawings. Throughout the description and drawings, similar reference numbers by differences of 100 may be used to identify similar elements.

DETAILED DESCRIPTION

Figure 1A:
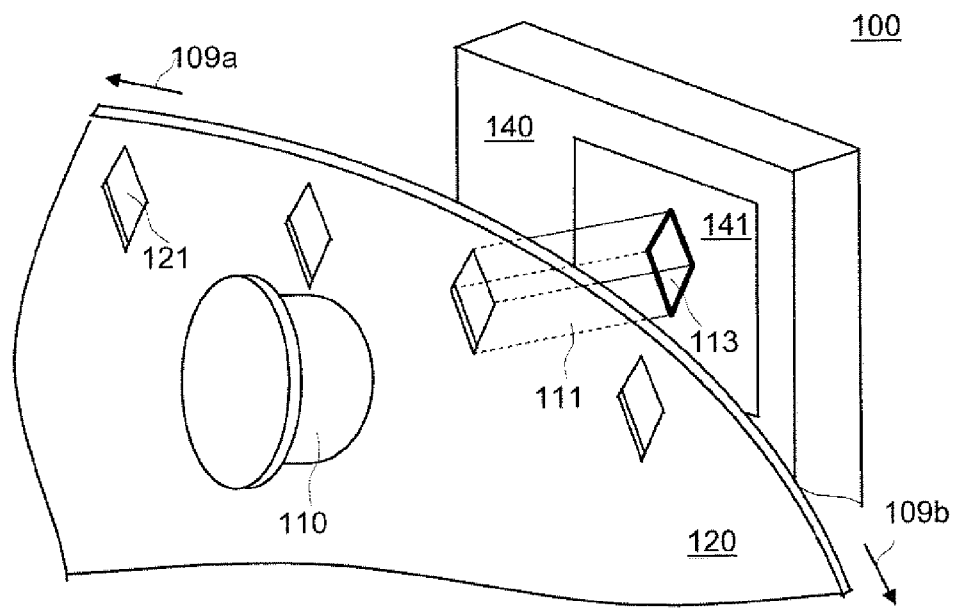
FIG. 1A illustrates a perspective, cut-away view of a transmissive rotary encoder without a reticle.
Figure 1B:
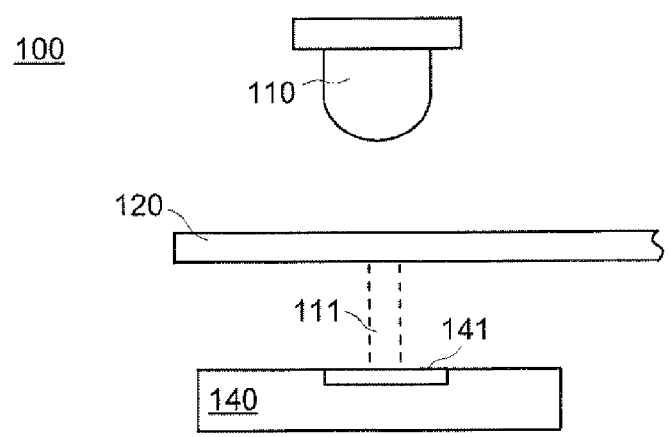
FIG. 1B illustrates a side, cut-away view of a transmissive rotary encoder without a reticle.
Figure 2A:
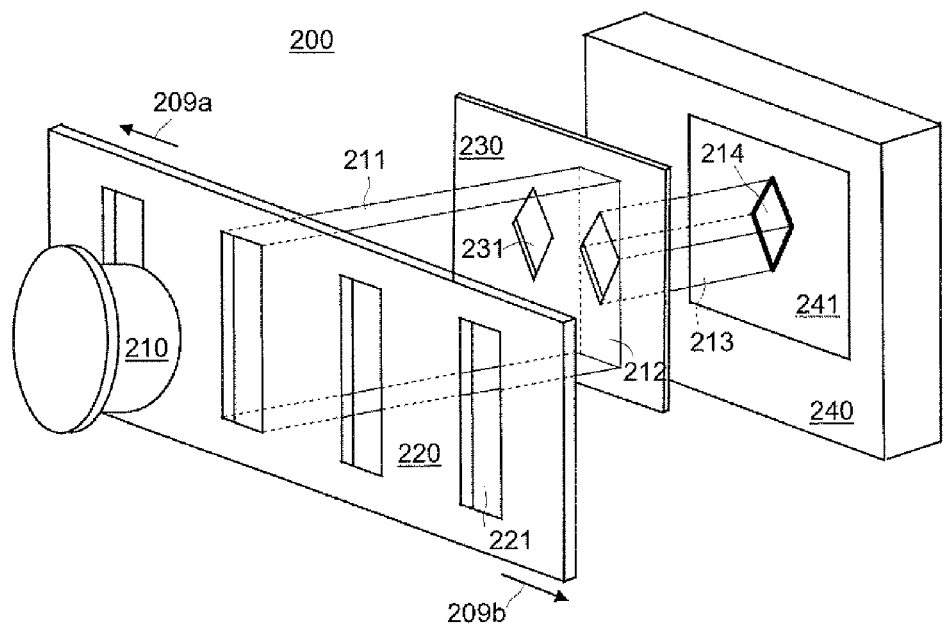
FIG. 2A illustrates a perspective view of a transmissive linear encoder with a reticle.

FIG. 1A illustrates a partial, perspective view a transmissive rotary encoder 100 without a reticle. The rotary encoder 100 may form a portion of a motor control system, which may be used to sense and detect rotation of a moving disc. A side, cut-away view of the transmissive rotary encoder 100 is shown in FIG. 1B. The transmissive rotary encoder 100 may comprise a light source 110, a coding member 120, a detector die 140 having at least a photo-detector 141. The coding member 120 may be a code wheel, as shown in FIG. 1A or a linear code strip as shown in FIG. 2A, or any other similar configuration that may be required or desired in a particular application.

The coding member 120 may have a plurality of light windows 121. For code wheel type of coding member 120, the light windows 121 may be positioned in a row spaced out systematically at the periphery around the center of the coding member 120. The encoder 100 may comprise at least two rows of the light windows 121 and at least two photo-detectors 141 below each row so that both distance and direction of the rotation can be detected, as illustrated in more detail in FIGS. 4A-4C. For simplicity, only one row of the light windows 121 with the corresponding photo-detector 141 are shown to illustrate the relationship of the coding member 120 and the photo-detector 141 in FIG. 1A.

Referring now to FIG. 1A and FIG. 1B, the light windows 121 may be configured to allow light beam 111 to be transmitted through the coding member 120 in a periodic pattern as the coding member 120 rotates in the direction of either 109a or 109b. As the coding member 120 rotates, a light spot 113 of a predetermined shape defined by the light window 121 may be projected onto the photo-detector 141.

The light windows 121 may define any shape. However, the light windows 121 of a coding member 120 usually define a rectangular shape. In the embodiment shown in FIG. 1A, the light windows 121 may define a diamond shape, such that the photo-signal detected may be a quasi sinusoidal waveform or a sinusoidal waive form. The photo-signal detected using a photo-detector 141 may be a function of the area of the light spots 113 falling onto the photo-detector 141. Other shapes such as elliptical, circular, oval or any other similar shape may also be suitable to produce a quasi-sinusoidal waveform.

An optical lens (not shown) may be placed between the light source 110 and the coding member 120, or between the coding member 120 and the detector die 140 or both of the above mentioned locations, depending on design requirements. The optical lens may be configured to collimate light emitted from the light source 110 or to focus the light beam 111 onto the photo-detector 141, such that the size of the light spot 113 may be modified.

If the light windows 121 are not aligned properly on the photo-detector 141, the performance of the encoder 100 may not be efficient. However, the photo-detector 141 may be assembled on a printed circuit board (referred to hereinafter as "PCB") or another housing that is then assembled on another part of the system that houses the coding member 120. This arrangement may result in more alignment errors that may affect the performance of the encoder 100. In order to overcome any such alignment issues, a reticle 230 may be used together with the coding member 220, as shown in FIG. 2A.

Figure 2B:
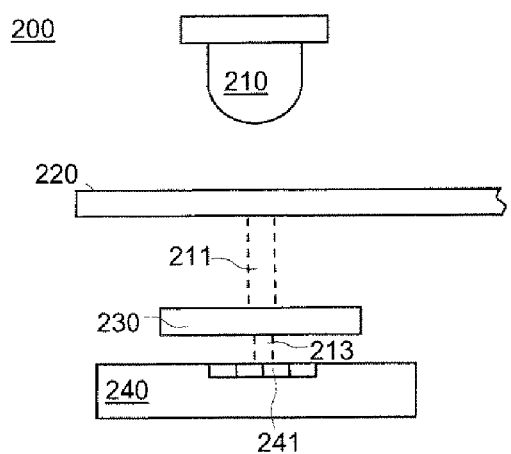
FIG. 2B illustrates a side, cut-away view of a transmissive linear encoder with a reticle.

FIG. 2A illustrates a perspective view of a transmissive linear encoder 200 having a reticle 230. The linear encoder 200 may be part of a motor control system configured to detect the distance a machine component moves in a linear direction. A side, cut-away view of the linear optical encoder 200 is shown in FIG. 2B. The linear optical encoder 200 may comprise a light source 210, a coding member 220, a reticle 230, and a detector die 240. The detector die 240 may comprise a photo-detector 241 adapted to received light from the light source 210. The coding member 220 may be a linear code strip having rectangular light windows 221 to allow light to be transmitted through. The coding member 220 may be configured to move in a linear fashion in either direction 209a or 209b.

Unlike the detector die 240 that may be assembled onto a PCB or a housing that may be later assembled on part of a motor system, the reticle 230 may be assembled in the final assembly process after the coding member 220 and the detector die 240 have been fixed in place. The photo-detector 241 may be larger than required to allow for tolerance in placement or alignment error of the detector die 240. As the alignment may be performed in the final process with the placement of the reticle 230, the alignment error may not cascade and degrade the encoder performance, as may be the case for the encoder 100 shown in FIG. 1A. In addition, the reticle 230 may be more precisely aligned using a tool or a jig (not shown) to minimize the alignment error, because the coding member 220 has been fixed.

Referring to FIG. 2A and FIG. 2B, the light source 210 may be configured to generate light, such that a light beam 211 may be emitted from the rectangular light window 221 of the coding member 220. The light beam 211 may create a substantially rectangular light spot 212 on the reticle 230. The reticle 230, having openings or light windows 231 of a specific shape may then transform the shape of the light spot 212 into light spot 214 on the photo-detector 241, so that a quasi-sinusoidal waveform or sinusoidal waveform may be generated by the photo-detector 241. For this purpose, the suitable shape of the light windows 231 may be diamond, oval, elliptical or circular shape which are capable of producing quasi-sinusoidal or sinusoidal signals in proper configuration. As shown in FIG. 2A, the light beam 213, after being transmitted through the light window openings 231 of the reticle 230, may project a diamond shape light spot 214 onto the photo-detector 241.

Referring to FIG. 2B, an optical lens (not shown) may be placed between the light source 210 and the coding member 220, or between the coding member 220 and the reticle 230, or in both positions as discussed previously. Usually for encoders 100 without a reticle, as one shown in FIG. 1A, changing the resolution of the encoder means changing the coding member 120 (See FIG. 1A) to one having different size light windows 121 (See FIG. 1A). However, for encoders 200 with a reticle 230, changing the resolution may merely mean substituting a different lens (not shown) and a different reticle 230. This may be due to the fact that the size of the light spot 212 projected on the reticle 230 may be changed by the lens. From a designer's point of view, this is another benefit of using a lens for an optical encoder 200 with a reticle 230, as shown in FIG. 2A, as it is easier to change a lens and a reticle than changing a coding member.

As the coding member 220 moves along the direction of 209a or 209b, the size of the light spots 212 and 214 change periodically at a frequency relative to the speed of the coding member 220. The reticle 230 may be fixed onto the photo-detector 240, which may remain stationary. When the positions of the light spots 212 align with the openings or the light windows 231 of the reticle 230, full light spots 214 may be projected onto the photo-detector 241. However, when the positions of the light spots 212 do not fall on the openings or light windows 231, the light spot 214 on the photo-detector 241 may not be created. This is shown in FIGS. 3A-FIG. 3B.

Figure 3A:
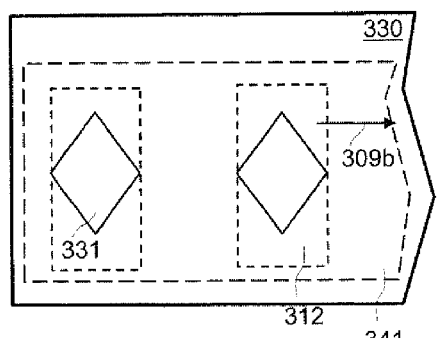
FIGS. 3A-3D illustrate how a sinusoidal signal may be generated using a reticle having diamond shape light windows.
Figure 3B:
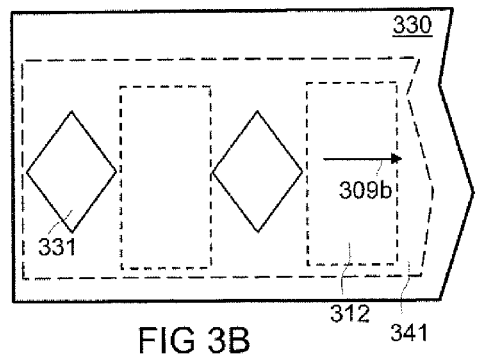
Figure 3C:
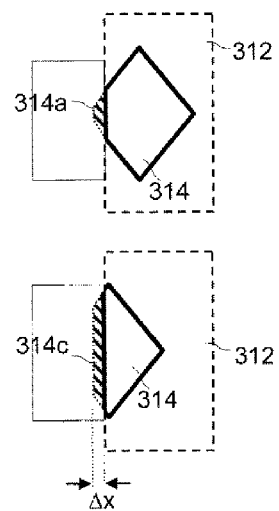
Figure 3D:
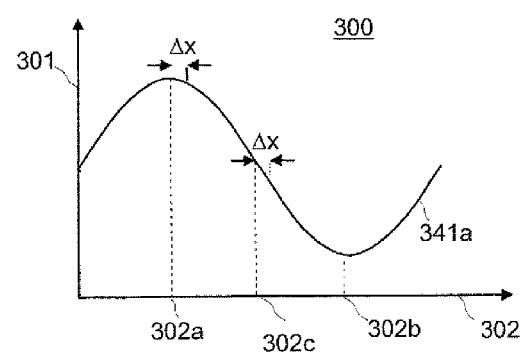

FIG. 3A shows an embodiment in which light spots 312 coincide with light windows 331 of the reticle 330. In FIG. 3B, the light spots 312 are blocked by the reticle 330. FIG. 3C shows how the area of the light spot 314 on the photo-detector 341 changes, as the light spot 312 moves away from the openings or light windows 331 of the reticle 330 in the direction of 309b. FIG. 3D shows a graph 300 illustrating photo-current 341a generated by the photo-detector 341 corresponding to the position of the light spots 312.

In FIG. 3D, the Y-axis 301 of the graph 300 represents the photo-current 341a and the X-axis 302 of the graph 300 represents the position of the light spot 312. Referring to FIG. 2A, and FIGS. 3A-3C, at position 302a, the light spots 312 coincide with the light windows 331, as shown in FIG. 3A and therefore, the photo-current 341a generated is at a maximum value. Likewise, at position 302b, the light spots 312 are blocked by the reticle 330, as shown in FIG. 3B, and therefore, the photo-current 341a generated is at a minimum value. As seen in the graph of FIG. 3D, although the light spots 312 are being blocked completely, photo-current 341a generated may not be zero, but rather a low current at shown in FIG. 3D at 302b. This phenomenon is due to the fact that the photo-current 341a is generated by not only the light from the light source 210 (See FIG. 2A), but also by ambient light leaking onto the photo-detector 341, as well as dark current that may be inherently produced inside the photo-detector 341.

The photo-current 341a generated may be a function of the area of the light spot 214 (See FIG. 2A) formed on the photo-detector 341. Therefore, theoretically it may be possible to produce a sinusoidal waveform by selecting a light window 331 having an area exactly representing a sine waveform. However, practically this may not be the case because other factors such as light refraction, the inherent capacitance and shape of the photo-detector 341 may also contribute to the amount of photo-current 341a generated. By considering other effects impacting the photo-current 341a, various shapes, such as diamond, oval, circular or other similar shapes may be used for the light windows to produce a quasi-sinusoidal or sinusoidal waveform. Additionally, optical simulations may be carried out to determine suitable sizes and shapes for the light windows 331, depending on the design.

As shown in the graph 300 of FIG. 3D, the photo-current 341a reduces at a slower rate at position 302a compared to the position 302c for a small similar fixed distance Δx traveled by the light spot 312. The rate of reduction may peak at the position 302c. This may be explained considering how the size of the corresponding light spots 314 generated on the photo-detector 341 changes at location 302a and 302c as shown in FIG. 3C.

Referring to FIG. 3C, the light spot 314 generated at position 302a may be reduced by the size of 314a when the light spot 312 is displaced by a distance of Δx. In contrast, at position 302c, the light spot 314 may be reduced by the size of 314e for the same displacement of Δx. As shown in FIG. 3C, the size of 314c may be much different compared to the size of 314a. The estimation and calculation of the photo-current 341a may be done with proper modeling of the photo-detector 341 and optical simulation, as known in the art.

Figure 4A:
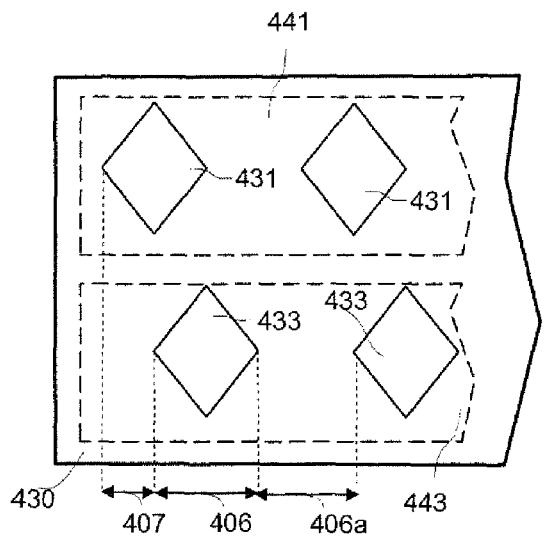
FIGS. 4A-4C illustrate how two sinusoidal signals 90 degrees out of phase may be generated using a reticle having two rows of light windows.

In order to detect the speed, as well as the direction of the movement, two waveforms 341a similar to those shown in FIG. 3D are typically required. FIG. 4A shows a reticle 430 having two groups of the light windows 431 and 433 that are staggered systematically apart in different rows. The detector die 240 (shown in FIG. 2A) may comprise at least two photo-detectors 441 and 443 configured to be placed correspondingly beneath each group of the light windows 431 and 433, respectively. In optical encoders, the number of rows of the photo-detectors 441 and 443 are referred to as the number of tracks of the encoder. As shown in FIG. 4A, all the light windows 431 and 433 may have the same shape and dimensions. The diamond shape of the light windows 431 and 433 have a maximum diameter 406 of D at the center portion. The light window 431 and 433 from within the same group may be separated by a distance 406a from each neighboring light windows 431 or 433. The distance 406a may be approximately equal to or slightly more than the maximum diameter 406 of D.

Figure 4B:
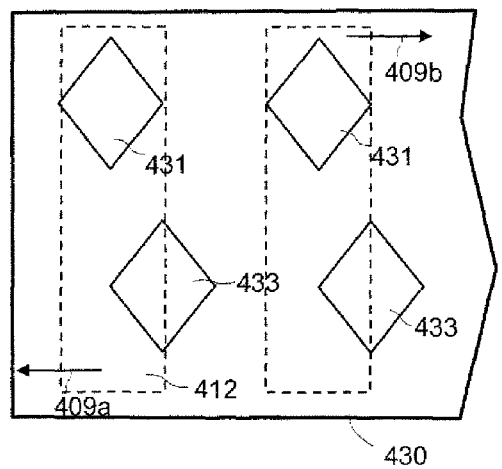
Figure 4C:
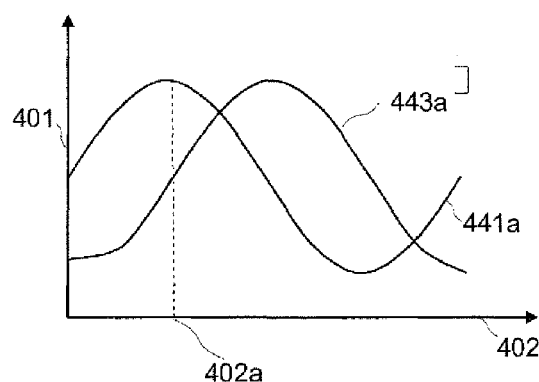

In one embodiment shown in FIGS. 4A-4C, the coding member 220 (See FIG. 2A) may be configured to move back and forth in either the 409a or 409b direction along a generally horizontal path. Therefore, the light spot 412 generated at the reticle 430 may move either in the direction 409a or 409b, as shown in FIGS. 4A-4B. The light windows 431 and 433 from within the same group may be positioned in a spaced apart manner along the path of movement of the light spot 412. In the embodiment shown in FIG. 4A, the light windows 431 and 433 from within the same group may be placed in a spaced apart manner along the same horizontal row that the light spots 412 travel horizontally within.

Each light window 431 and 433 from within a group may be placed at a distance 407 of ½D from a corresponding light window 431 and 433 from within the different group, in order to obtain two signals that are 90 degrees out of phase. For the embodiment shown in FIG. 4A, all the light windows 431 from within the first group may be arranged in a horizontal row, whereas all the light windows 433 from the second group may be arranged in another horizontal row vertically displaced from the horizontal row of the first group. In addition, the light windows 431 of the first group may be horizontally displaced by a distance of ½D from the light windows 433 of the second group. Consequently, the photo-detectors 441 and 443 may be placed in a similar manner to correspond with the light windows 431 and 433.

FIG. 4C illustrates photo-currents 441a and 443a of the photo-detectors 441 and 443 plotted against the distance traveled by the light spots 412 in the direction of 409b. The Y-axis 401 represents the electric current, whereas the X-axis 402 represents relative distance traveled. When the light spots 412 travel in the direction of 409b, the waveform 443a will lead the waveform 441a by 90 degrees. For example, at the position 402a as shown in FIG. 4B, the light spots 412 coincide completely with the light windows 431 and therefore, the photo-current 441a may be at maximum. However, at position 402a, only one half of the light window 433 is illuminated and the corresponding output of the photo-current 443a is at the mid point.

Figure 5A:
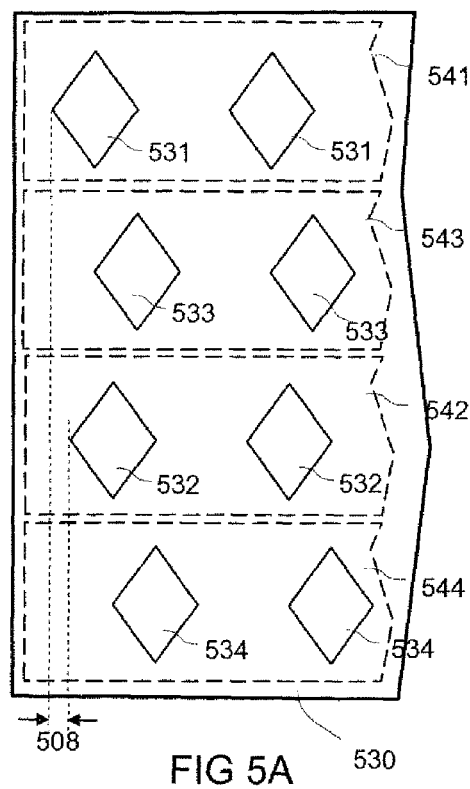
FIG. 5A illustrates a reticle for linear encoders comprising four groups of light windows arranged in four rows configurable to produce four photo-signals that are 45 degrees out of phase.

Considering waveforms 441a and 443a as two sinusoidal waveforms generated as the light spots 412 travel in the direction of 409b, it may be observed that the photo-current 441a is 90 degrees out of phase with the photo-current 443a. Also, the photo-current 441a is leading photo-current 443a, as shown in FIG. 4C. For the embodiment shown in FIGS. 4A-4C, when light spots 412 travel in the direction of 409b, photo-current 441a will be leading photo-current 443a. However, when light spots 412 travel in the direction of 409a, photo-current 443a will be leading photo-current 441a. The two waveforms may be 45 degrees out of phase by reducing the distance 407 to ¼D. FIG. 5A illustrates how four photo-signals that are each 45 degrees out of phase may be obtained.

In FIG. 5A, the reticle 530 comprises four individual groups of light windows 531, 532, 533, and 534, each group being arranged in horizontal rows, respectively. Photo-detectors 541, 542, 543, and 544 may be placed beneath light windows 531, 532, 533, and 534, respectively. Each of the light windows 532 within the second group may be placed at a distance 508 that is ¼D away from the corresponding light windows 531 within the first group, so that photo-signals generated in the first and second photo-detectors 541 and 542 are 45 degrees out of phase. Correspondingly, the third group of the light windows 533 may be displaced horizontally ¼D from the second group of the light windows 532, and the fourth group of the light windows 534 may be displaced horizontally ¼ D from the third group of the light windows 533. The placement and arrangement of the light windows 531-534 enable the photo-detectors 541-544 to generate four photo-signals that are 45 degrees out of phase from each other.

Figure 5B:
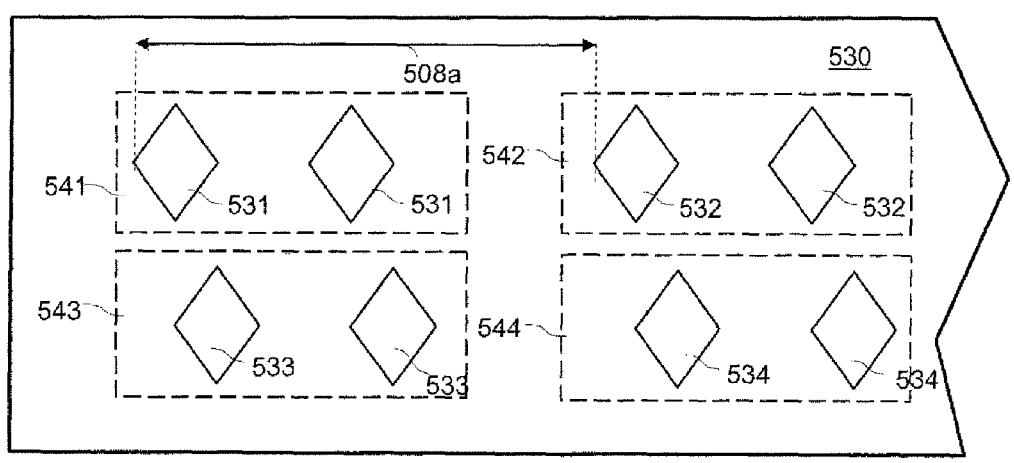
FIG. 5B illustrates a reticle for linear encoders comprising four groups of light windows arranged in two rows configurable to produce four photo-signals that are 45 degrees out of phase.

Each group of the light windows 531-534 in FIG. 5A do not need to be displaced vertically to form a column having multiple rows as shown in FIG. 5A. In fact, each group of the light windows 531-534 may be placed anywhere within the vicinity of the reticle 530 even on the same horizontal row, as shown in FIG. 5B with the condition that light spots 412 are generated periodically at a distance of D on the reticle 530, as shown in FIG. 4B. For example, in the embodiment shown in FIG. 5B, the second group of the light windows 532 may be positioned at the same horizontal row as the first group of the light windows 531. However, each of the light windows 542 within the second group may be placed at a distance 508a of (2D×N)+¼D (where N=1, 2, 3, . . . ) from the first group of the light windows 531. Correspondingly, the fourth group of the light windows 534 may be placed horizontally or in the direction of the light spot 412 movement 409a or 409b, as in FIGS. 4A-4B from the third group of the light windows 533, as shown in FIG. 5B. Similarly, the distance between the third and fourth groups of the light windows 533-534 may be 508a.

Figure 6:
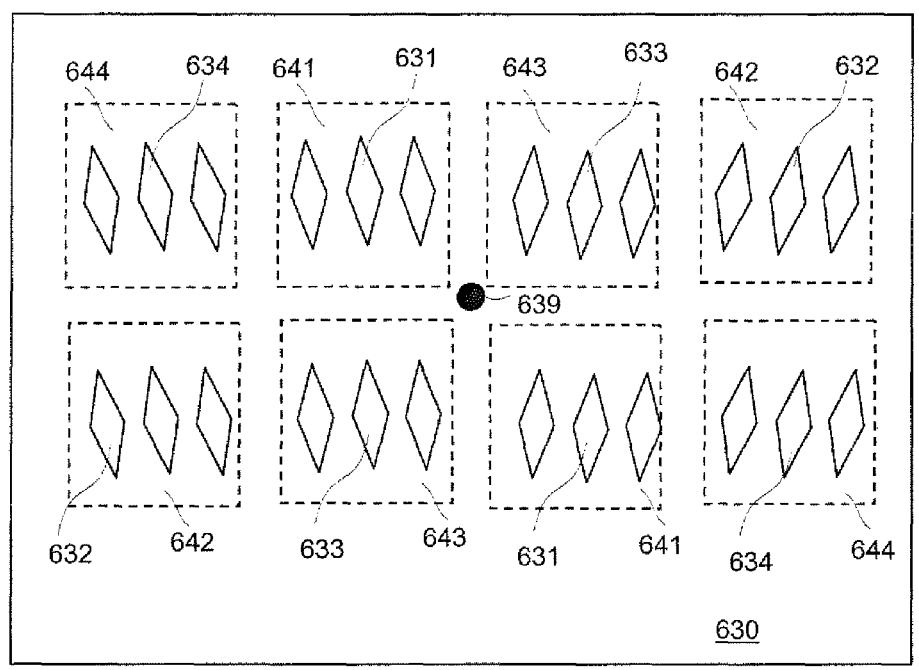
FIG. 6 illustrates a reticle comprising four groups of light windows arranged in common centroid manner.

FIG. 6 illustrates an embodiment showing a reticle 630 for a rotary encoder having four groups of the light windows 631-634 arranged in multiple columns and rows. Unlike the reticle 530 for linear encoders in which all the light windows 531-534, as shown in FIGS. 5A-5B, which may be parallel, the light windows 631-634 for rotary encoders may be arranged in accordance with a radial direction of movement. Photo-detectors 641, 642, 643, and 644 may be placed beneath each group of the light windows 631, 632, 633, and 634, respectively. There may be eight photo-detectors 641-644 in total, arranged in two rows. Individual photo-detectors 641-644 arranged beneath similar groups of light windows 631, 632, 633, and 634 may be electrically connected. For example, photo-detectors 644 in the two rows may be electrically connected to each other.

Unlike the reticle 530 shown in FIGS. 5A-5B, in FIG. 6 each row comprises the light windows 631-634 from all the groups. The embodiment in FIG. 6 comprising light windows 631-634 arranged in four columns in which each column may comprise light windows 631-634 from each of the groups. In addition, the light windows 631-634 from the same group may be arranged diagonally opposite of each other, so that the center of gravity of each of the groups may be positioned overlapping each other substantially at the center 639 of the reticle 630. This type of arrangement may be referred to as a common centroid technique. The technique may be applied to designs of the four groups of the light windows 631-634, arranged in four rows and four columns following the principle that the center of gravity 639 of each of the groups may be overlapping each other at the center 639.

The common centroid technique may be effective in reducing the effect of misalignment. For example, consider a scenario, in which one row of the light windows 631-634 is misaligned, such that the light falling on the corresponding photo-detectors 641-644 is reduced. As the light received at the photo-detectors 641-644 is less than the design value, the amplitude of the corresponding photo-signals generated may be less than the original design value. However, the effect may be seen in all the groups of the light windows 631-634 and may be eliminated in subsequent stages. This concept will be explained further herein below.

Figure 7A:
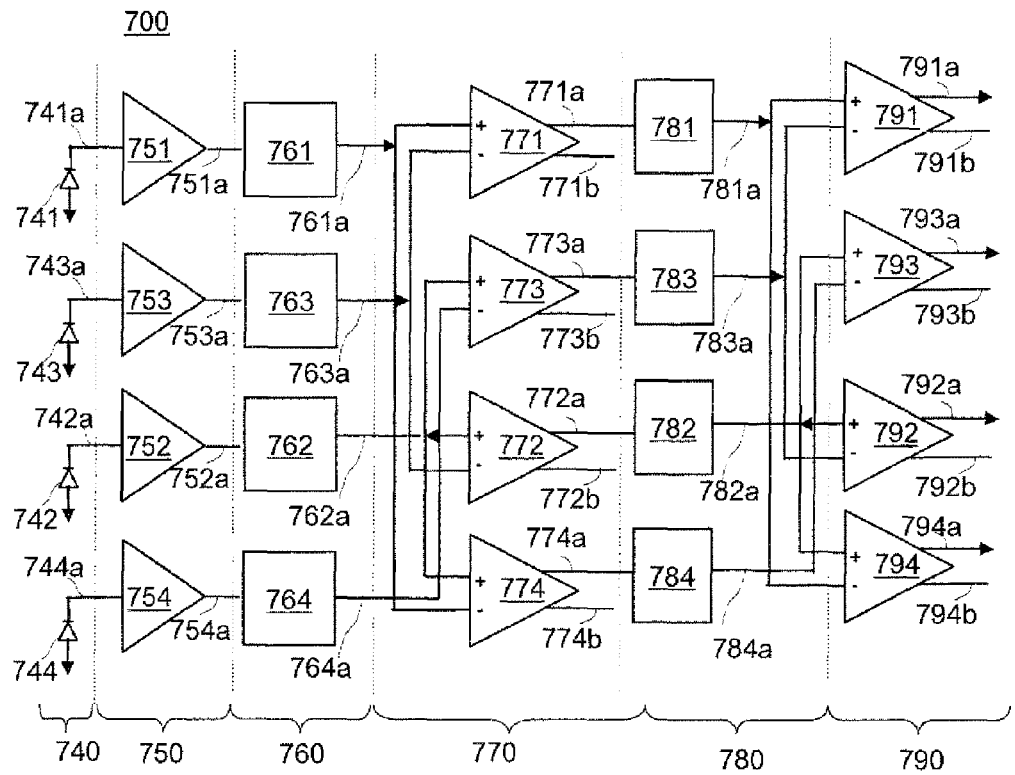
FIG. 7A illustrates a block diagram comprising photo-detectors and interpolation circuit for increasing resolution of encoders.

FIG. 7A shows an embodiment illustrating interpolation circuit 700 together with the photo-detectors 741-744. The interpolation circuit 700 may be used for any type of encoder. As shown in FIG. 7A, the circuit may be separated into multiple stages comprising a photo-detector stage 740, an amplifying stage 750, a first multiplying stage 760, a first differential stage 770, a second multiplying stage 780, and a second differential stage 790. Depending on the resolution required, the multiplying stage 760 and the differential stage 770 may be repeated, as needed. The photo-detector stage 740 may not be part of the interpolation circuit 700 but implemented using a different integrated die or integrated together with the interpolation scheme as shown in FIG. 7A.

The photo-detector stage 740 may comprise a plurality of photo-detectors 741-744. As shown in previous embodiments, the photo-detectors 741-744 may be implemented using more than four photo-detectors 741-744 with each of them being placed beneath a group of the light windows 631-634, as shown in FIG. 6. The photo-detectors 741-744 belonging to the same group may be electrically connected to each other, so that the photo-detectors 741-744 may be configured to generate four photo-signals 741a-744a. Depending on the arrangement of light windows 631-634 of the reticle 630, shown in FIG. 6, the photo-signals 741a-744a may be 45 degrees out of phase.

The photo-signals 741a-744a may not be strong enough to drive circuits in the subsequent stage. Therefore, amplifiers 751-754 may be required in the amplifying stage 750, as shown in FIG. 7A. The amplifiers 751-754 may be trans-impedance amplifiers. The amplifiers 751-754 may be configured to amplify the photo-signals 741a-744a into four first stage signals 751a-754a. As the four first stage signals 751a-754a may be generated using the coding members 220 having light windows 221 moving at a speed in a particular direction, as shown in FIG. 2A, the first stage signals 751a-754a may have a first frequency. The first frequency may be proportional to the speed of movement of the coding member 221, shown in FIG. 2A. As the coding member 221 may come to a complete stop, the first frequency may range from a low frequency of zero (stationary state) to a high frequency of hundreds or even thousands of kilohertz. The amplifying stage 750 may be optional depending on whether or not the drive strength of the photo-signals 741a-744a is sufficient.

The first stage signals 751a-754a may be modeled using a general mathematical formula as in equation (1), in which A, a, C, and ϕ are constants. Referring to FIG. 2A, FIG. 4A and FIG. 7, x may represent the displacement of the coding member 220 or a relative distance of the coding member 220 to a reference point (not shown) whereas D represents the width 406 of the light windows 431-434 and ω represents the frequency.

$$y = A\sin(a\omega x/(2D)+\phi)+C \quad (1)$$

In order to avoid mathematical complexity and to add clarity to the description, an example of the first stage signals 751a-754a, based on the simplified model $S_{11}$, $S_{12}$, $S_{13}$ and $S_{14}$, as shown in equation (2) are illustrated. However, similar results may be obtained using proper modeling shown in equation (1).

$$S_{11} = \sin(\omega x)$$

$$S_{12} = \sin(\omega x + \pi/4)$$

$$S_{13} = \sin(\omega x + \pi/2) = \cos(\omega x)$$

$$S_{14} = \sin(\omega x + 3\pi/4) = \cos(\omega x + \pi/2) \quad (2)$$

The first multiplying stage 760 may comprise a plurality of multipliers 761-764. The multipliers 761-764 may be any conventional circuit capable of multiplying the signals. Each of the four first stage signals 751a-754a may be self-multiplied or cross multiplied to obtain a plurality of second stage signals 761a-764a having a frequency two times the first frequency based on the trigonometry equation as shown in equation (3).

$$\sin(2\omega x) = 2\sin(\omega x)\cos(\omega x)$$

$$\cos(2\omega x) = 1 - 2\sin^2(\omega x) \quad (3)$$

In analog circuit implementations of the multipliers 761-764, analog multiplier circuits may have additional capabilities, such as inverting the signals, imposing phase shift, or even filtering out some higher frequency components of the signals. Unlike mathematical equations, multiplication with any coefficient may be easily implemented by changing the gain of the analog circuitry. Another approach for accomplishing this is by converting all of the signals into digital signals and then utilizing a micro-controller to compute the mathematical equation. However, digital computations may lack some of the capabilities of analog multipliers, as discussed above.

In the embodiment shown in FIG. 7A, the multipliers 761-764 carry out the function to convert sin(x) into sin(2x). Therefore, the second stage signals 761a-764a may be modeled as $S_{21}$, $S_{22}$, $S_{23}$ and $S_{24}$, shown in equation (4). The multipliers 761-764 may be configured to carry out some other similar function, such as 1−2 cos(2x), or cos(2x). However, the outputs obtained may still be signals with double the first frequency, but 90 degrees (or π/2 in radiant) out of phase.

$$S_{21} = \sin 2 \times (\omega x) = \sin(2\omega x)$$

$$S_{22} = \sin 2 \times (\omega x + \pi/4) = \sin(2\omega x + \pi/2) = \cos(2\omega x)$$

$$S_{23} = \sin 2 \times (\omega x + \pi/2) = \sin(2x + \pi) = -\sin(2\omega x)$$

$$S_{24} = \sin 2 \times (\omega x + \pi/4) = -\cos(2\omega x) \quad (4)$$

To prepare for further multiplication of the frequency of the second stage signals 761a-764a, a combination of the second stage signals 761a-764a may be connected to the first differential stage 770 comprising differential circuits 771-774 to obtain signals that are 45 degrees out of phase, utilizing the trigonometry equations shown in equation (5). The differential circuits 771-774 may be fully differential circuits. The feedback resistors and reference voltages are omitted in FIG. 7A for simplicity.

$$\sin(2\omega x + \pi/4) = 1/(\sqrt{2})(\sin(2\omega x) + \cos(2\omega x))$$

$$\cos(2\omega x + \pi/4) = 1/(\sqrt{2})(\cos(2\omega x) - \sin(2\omega x)) \quad (5)$$

For example, this may be accomplished by computing the differences of a combination of the third stage signals 771a-774a, as shown in FIG. 7A, and multiply the computed differences with constants to obtain a plurality of third stage signals 771a-774a and 771b-774b. The mathematical model is shown in equation (6).

$$\frac{1}{2} \times (S_{21} - S_{23}) = \sin(2\omega x)$$

$$1/(\sqrt{2}) \times (S_{22} - S_{23}) = \sin(2\omega x + \pi/4)$$

$$\frac{1}{2} \times (S_{22} - S_{24}) = \cos(2\omega x)$$

$$1/(\sqrt{2}) \times (S_{22} - S_{21}) = \cos(2\omega x + \pi/4) \quad (6)$$

The constants used in the embodiment are {½, 1/√2, ½, 1/√2}, respectively, as shown in equation (6). Although a specific combination of $S_{21}$–$S_{23}$, $S_{22}$–$S_{23}$, $S_{22}$–$S_{24}$ and $S_{22}$–$S_{21}$, as shown in equation (6) may be selected, other combinations may be possible, applying the principle shown in equation (5) to generate signals that are 45 degrees (π/4 in radiant) out of phase.

The technique used in the first multiplying stage 760 to double the frequency, as well as the technique used in the first differential stage 770 to reproduce the signals that are 45 degrees out of phase may be repeated. For example, as shown in FIG. 7A, the output of the first differential stage 771a-774a may be connected to a second multiplying stage of 780, comprising multipliers 781-784 to obtain a plurality of fourth stage signals 781a-784a that are two times the frequency compared to the third stage signals 771a-774a and 771b-774b. The frequency of the fourth stage signals 781a-784a is four times the first frequency compared to the first stage signals 751a-754a.

Generally, the signals, for example the fourth stage signals 781a-784a, and for any subsequent stages may be modeled as in equation (7), where (N=2, 3, 4 . . . representing the stage of amplification). For example, to consider the second multiplying stage 780 and the second differential stage 790, N is equal to 2, and for a subsequent third multiplying stage (not shown) and a third differential stage (not shown), N would be equal to 3.

$$S_{2N1} = \sin(2^N \omega x)$$

$$S_{2N2} = \cos(2^N \omega x)$$

$$S_{2N3} = -\sin(2^N \omega x)$$

$$S_{2N4} = -\cos(2^N \omega x) \quad (7)$$

As discussed earlier, the fourth stage signals (2N stage signals) 781a-784a may be generated from the third stage signals (2N−1 stage signals) 771a-774a and 771b-774b. Similarly, a set of constants of {½, 1(√2), ½, 1(√2)} may be multiplied to a combination of the fourth stage signals (2N stage signals) 781a-784a to obtain a plurality of fifth stage signals (2N+1 stage signals) 791a-794a and 791b-794b, having the same frequency, but being 45 degrees out of phase utilizing equation (5), as shown in equation (8).

$$\frac{1}{2} \times (S_{2N1} - S_{2N3}) = \sin(2^N \omega x)$$

$$1/(\sqrt{2}) \times (S_{2N2} - S_{2N3}) = \sin(2^N \omega x + \pi/4)$$

$$\frac{1}{2} \times (S_{2N2} - S_{2N1}) = \cos(2^N \omega x)$$

$$1/(\sqrt{2}) \times (S_{2N2} - S_{2N1}) = \cos(2^N \omega x + \pi/4) \quad (8)$$

The output of the differential amplifiers 771-774 may have compliment output terminals 771b-774b that may be 180 degrees out of phase with the corresponding outputs of 771a-774a. The compliment signals 771a-774a and 771b-774b may be utilized to produce digital output signals, as shown in FIGS. 10A-10D. In addition, any of the signals 771b-774b may replace any of the signals 771a-774a to be input into the multipliers 781-784 to obtain the fourth stage signals 781a-784a. Although FIG. 7A shows that a specific combination of signals 781a-784a has been selected to be input into the differential amplifiers 771-774 or 791-794, other combinations may be possible. One such example is when the signals 771b-774b are selected instead of 771a-774a. In another embodiment where the multipliers 771-774 incur any phase shift, the combination shown in equation (6) or equation (8) may have to be altered. However, in any case, the circuit construction may be based on the trigonometry equations shown in equation (5) to obtain signals 45 degrees out of phase.

Theoretically, the technique of multiplying and computing the difference using the differential amplifiers 771-774 or 791-794 may be repeated, as many times as desired. However, in reality, after certain stages of interpolation, the noise and signal distortion may be too large, such that further interpolation may not yield any meaningful signals. With careful design of the circuit and with good alignment of the photo-detectors 241 to the light windows 221 of the coding member 220, as shown in FIG. 2, interpolation up to 128× may be possible. However, this may be improved with future circuit technology having improved signal to noise performance.

Figure 7B:
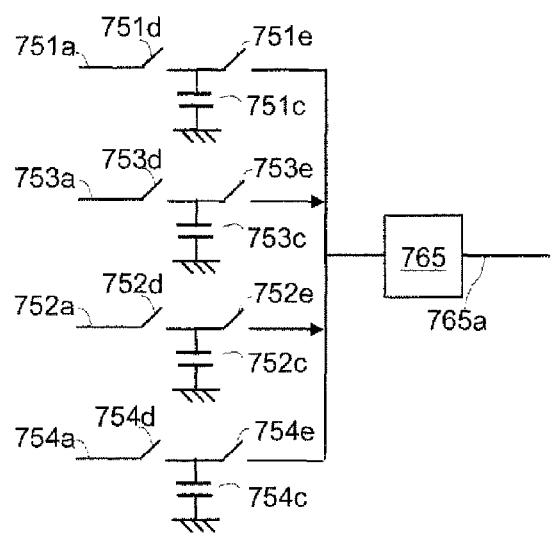
FIG. 7B illustrates a switch capacitor circuit using one multiplier.

In the embodiment shown in FIG. 7A, each stage comprises either four amplifiers 751-754, four multipliers 761-764 or 781-784, or four differential amplifiers 771-774 or 791-794. However, in another embodiment based on a to switch capacitor circuit, as shown in FIG. 7B, only one such circuit in each stage may be needed. Referring now to the embodiment shown FIG. 7B, the signals 751a-754a from the amplifier stage 750 may be connected to a plurality of capacitors 751c-754c through switches 751d-754d that may be then connected to a multiplier 765 through another set of switches 751e-754e. The capacitors 751c-754c may be configured to store the first stage signals 751a-754a by turning on the switches 751d-754d. After the signals are stored at the capacitors 751c-754c, the switches 751e-754e may be turned on one at a time to compute multiplication output 765a.

Figure 8A:
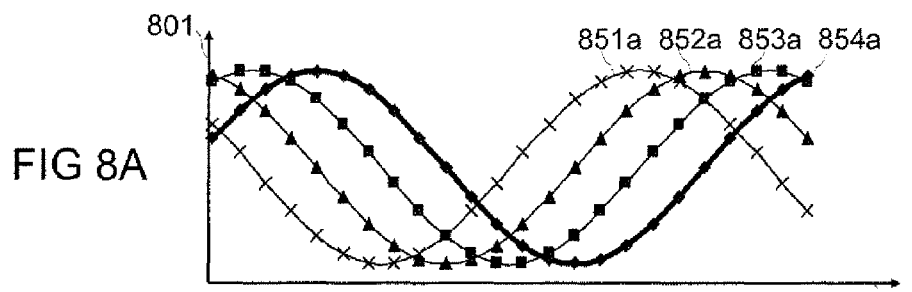
FIGS. 8A-8E illustrate signals generated by various stage of the interpolation circuit.
Figure 8B:
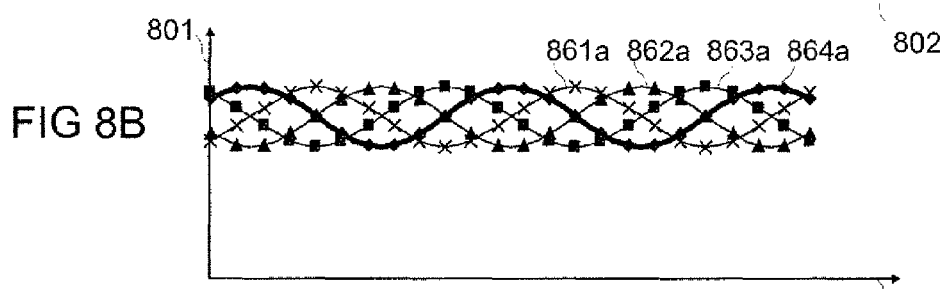
Figure 10:
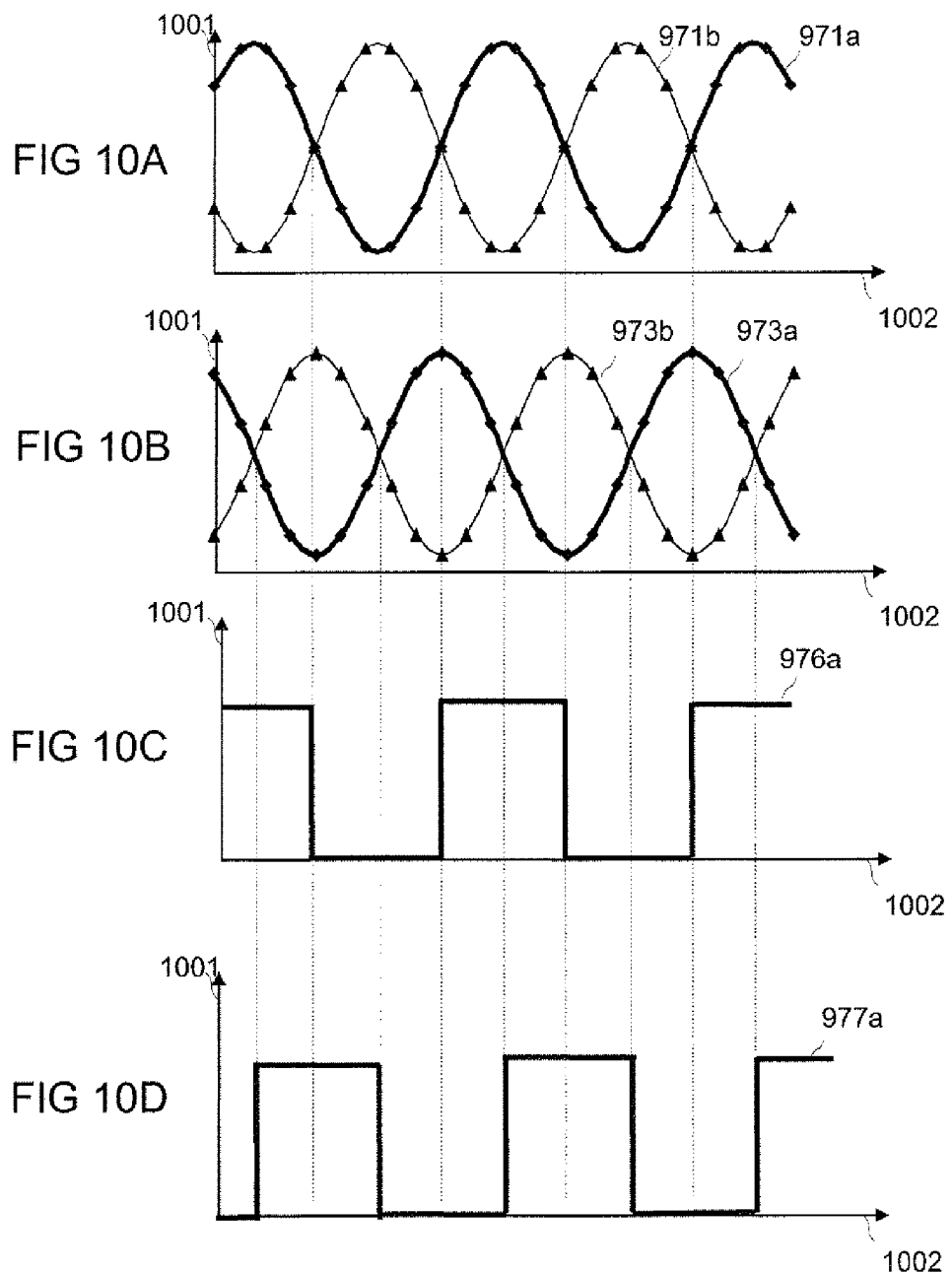
FIGs. 10A-10D illustrate how signals generated by differential amplifiers may be computed to obtain two digital outputs 90 degrees out of phase.

FIG. 8A-8E shows an example of the output waveform for each stage. The Y-axis 801 shows the amplitude of the signals, whereas the X-axis 802 shows the relative distance traveled by the coding member 220 (See FIG. 2A). Referring to FIG. 7A and FIGS. 8A-8C, the first stage signals 851a-854a may be 45 degrees out of phase having a first frequency, as shown in FIG. 8A. However, after the first multiplying stage 760, the second signals 861a-864a may become 90 degrees out of phase, but with a frequency double the first frequency, as shown in FIG. 8B. The amplitude of the signals 861a-864a may be different compared to the first stage signals 851a-854a. The second stage signals 861a-864a are 2× interpolated signals of 851a-854a, because the frequency has been doubled. However, the second stage signals 861a-864a may not be suitable for further interpolation using a circuit similar to the multiplying stage 760 for two reasons. First the amplitude may be too small for further interpolation. Second, the signals are 90 degrees out of phase. Further interpolation using the multiplying stage 760 may not yield signals having suitable cross-points for interpolation as illustrated in FIG. 10A-10C.

Figure 8C:
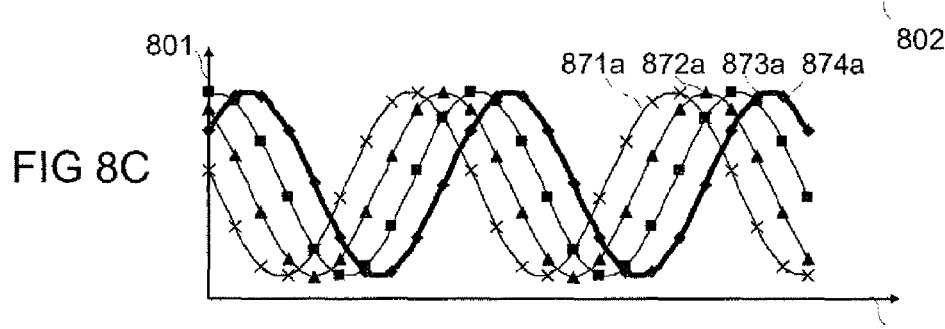

By computing the differences of a selected combination of the second stage signals 861a-864a, following the principle of equation (5), as shown in equation (6), third stage signals 871a-874a that are 45 degrees out of phase may be obtained, as shown in FIG. 8C. However, the frequency of the third stage signals 871a-874a may be similar to the second stage signals 861a-864a. Phase shift may occur during the multiplication or during computing the differences, using differential circuits 771-774 or 791-794, as shown in FIG. 7A. This may depend on the characteristic of individual circuits selected to carry out the functions. However, the frequency and phase relationship between the signals would remain the same as shown in FIG. 8C.

Figure 8D:
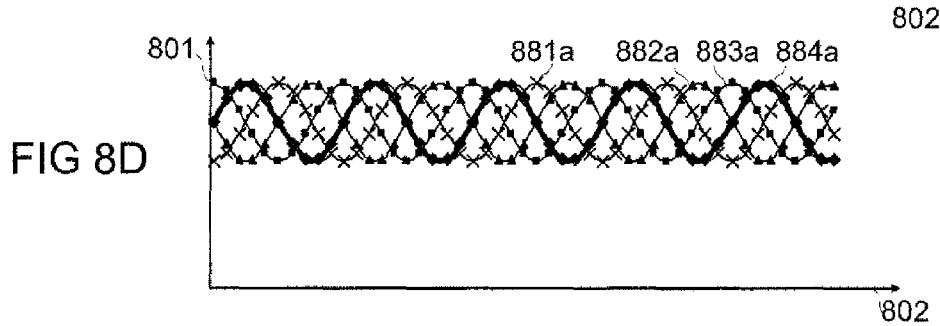
Figure 8E:
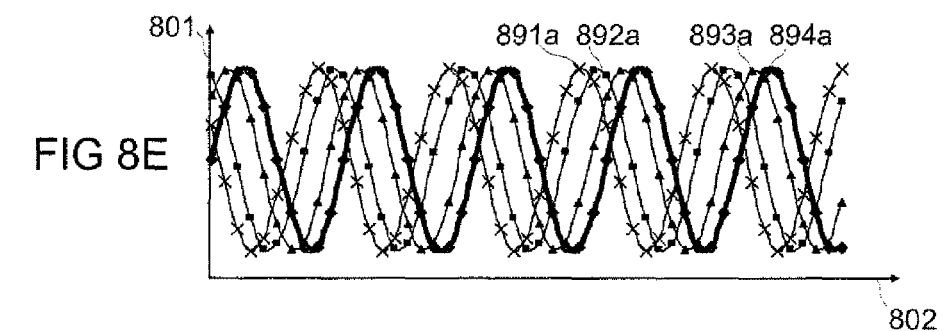

Referring to FIG. 7A, FIG. 8D and FIG. 8E, the third stage signals 871a-874a may go through further multiplying stages. For example, the second multiplying stage 780 obtains fourth stage signals 881a-884a having a frequency two times the third stage signals 871a-874a or four times the first stage signals 851a-854a. The fourth stage signals 881a-884a may be 90 degrees out of phase and smaller in amplitude than that seen in second stage signals 861a-864a. Similarly, the signals may be generated into fifth stage signals 891a-894a having larger a amplitude and being 45 degrees out of phase, available for further multiplication or interpolation. The signals 854a, 864a, 874a, 884a and 894 are shown with thick lines in each graph (see FIGS. 8A-E, respectively) for comparison of different stages.

The circuit, as shown in FIG. 7A, may become an analog interpolator by amplifying two of two final stage outputs, for example, 791a and 793a through output buffers (not shown). In another embodiment having N multiplying stage and N differential stage (not shown), two signals of the 2N stage signals or the 2N+1 stage signals having 90 degrees out of phase may be amplified by analog buffers to increase the current drivability. The analog output may be a quasi-sine and cosine curve 90 degrees out of phase, but having $2^N$ times frequency, indicating the signals has been interpolated $2^N$ times. For example, the first 871a and third 873a signals of the third stage signals 871a-874a may become an analog output of a 2× interpolation circuit by increasing drivability through analog buffers. Similarly, the first 861a and second signals 862a of the second stage signals 861a-864a, if amplified further for amplitude and current drivability, may also be suitable as an analog output with 2× interpolation.

Figure 9:
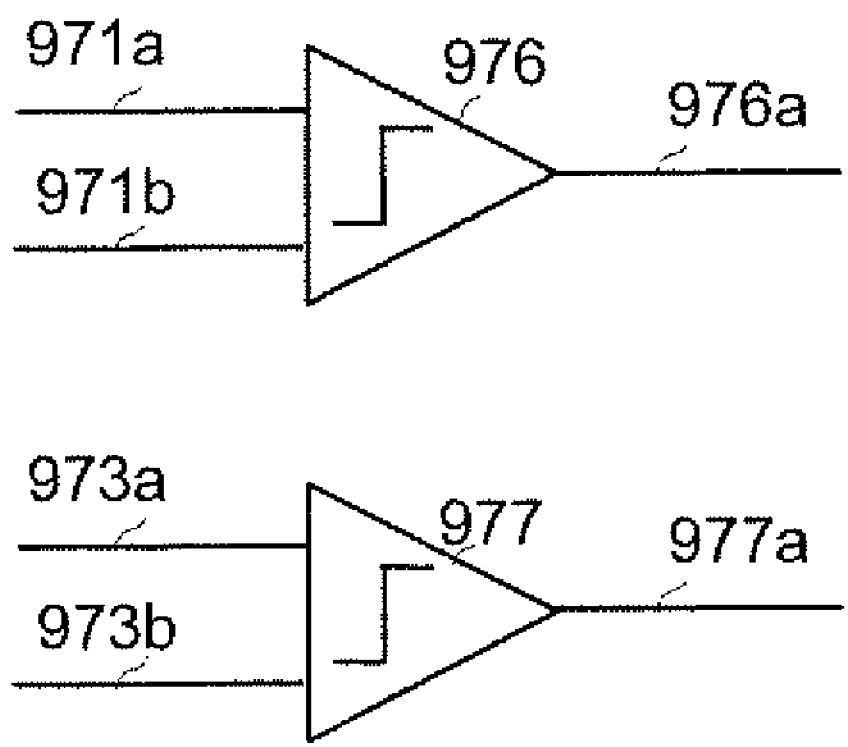
FIG. 9 illustrates comparators adaptable to produce digital output.

Similarly, after interpolation two signals of the 2N stage signals or the 2N+1 stage may be fed into comparators 976-977 to obtain digital output signals 976a-977a, as shown in FIG. 9. The related waveforms are shown in FIGS. 10A-10D. In FIGS. 10A-10D, the Y-axis 1001 represents the amplitude and the X-axis 1002 represents the position of the coding member (See FIG. 2A). In the embodiment shown in FIG. 9, the inputs to the respective comparators 976 and 977 may be two of the third stage signals 971a and 971b, as well as 973a and 973b, respectively. The signals 971a and 973a are 90 degrees out of phase. The inputs 971a and 971b may be related, such that the two signals are 180 degrees out of phase. In the embodiment, when 971a is larger than 971b, the output 976a of the comparator 976 may remain high or a digital "1". On the other hand, when 971a is smaller than 971b, the output 976a may be low or a digital "0". A similar relationship may apply to 973a and 973b. As such, the digital output 977a may be a digital signal that is 90 degrees out of phase compared to the digital output of 976a. Other configurations may be possible. For example, in another embodiment, the output of comparator 976a may remain low when 971a is larger than 971b.

The waveforms shown in FIGS. 10A-10B may be ideal waveforms without noise or distortion. In reality, noise may exist due to misalignment of the photo-detector 241, the reticle 230 and the coding member 220, shown in FIG. 2A. Accordingly, the waveforms may be distorted or having offsets. The distortion may be more complicated for rotary encoders, as shown in FIG. 1A, as the coding member 120 may wobble. In addition, the circuits used to implement the multiplication may inherently incur offset into the signals due to process variation in each of the transistors used to construct the circuit blocks.

In order to minimize the effect of noise and distortion of the signals, one technique is to compare only the cross points of two signals which are 180 out of phase. Another technique is to compare only at the center of the sine curve. Both these techniques are applied in FIGS. 10A-10B. More resolution may be obtained comparing different signals being 45 degrees or 90 degrees out of phase, but the cross point may not be at the center of the curve and may be susceptible to distortion and noise.

Another technique to achieve higher interpolation is through using four photo-detectors 241-244 and applying the common centroid technique, as shown in FIG. 6. The common centroid technique may produce signals less susceptible to misalignment or harmonic distortion. For example, referring to example illustrated in FIG. 6, in which one row of the photo-detectors 641-644 generate smaller photo-signals due to misalignment of the light windows 631-634, the misalignment has virtually no effect to the digital output, as shown in FIGS. 10C-10D. The reason is that even if the amplitude of the inputs 971a-971b and 973a-973b changes, the cross points remain the substantially the same, attributed to the common centroid arrangement, which ensures the reduction happens equally in all signals.

Although using four photo-detectors 741-744, as shown in FIG. 7A may produce photo-signals 741a-744a more suitable for interpolation, due to space and cost requirements, having four rows of the photo-detectors 741-744 may be inefficient from a cost and space perspective. Instead, two rows of photo-detectors may be preferred. In addition, in some situations there may be a need for interpolation on existing encoders 200 that may have two photo-detectors 241 generating two photo-signals 90 degrees out of phase, as shown in FIGS. 2A-B and FIGS. 4A-C.

Figure 11:
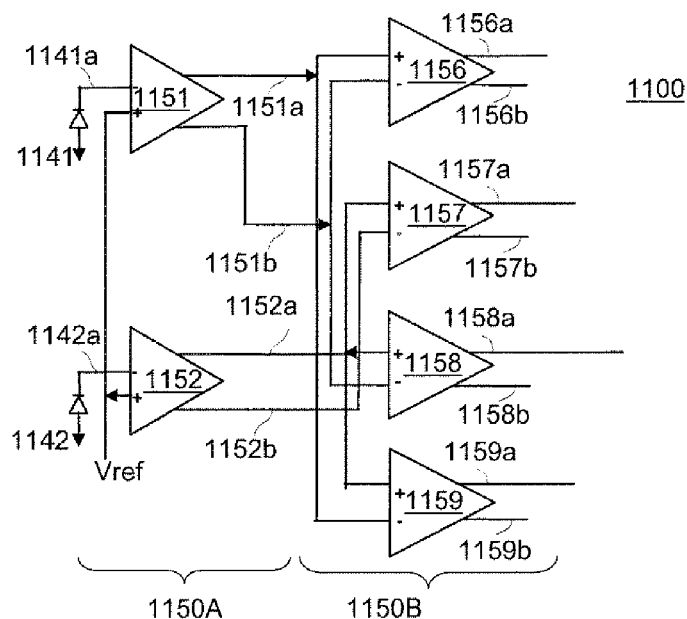
FIG. 11 illustrates a circuit comprising differential amplifiers configurable to generate signals 45 degrees out of phase from two photo-signals that are 90 degrees out of phase.

For use with encoders having two photo-detectors, the circuit shown in FIG. 7A may be applied by replacing the photo-detector stage 740 and the amplifying stage 750 with the circuit shown in FIG. 11. The technique applied may be very similar to equation (5), but with additional steps, because instead of four photo-detectors 741-744, as in FIG. 7A, there are only two photo-detectors 1141-1142, as in FIG. 11.

Referring to FIG. 11, the circuit 1100 may comprise an inverting and amplifying stage 1150A, and a differential stage 1150B. In the inverting and amplifying stage 1150A, the photo-signals 1141a and 1142a generated from the photo-detectors 1141 and 1142 may be inverted and amplified, respectively, to obtain a plurality of pre-multiply stage signals comprising 1151a, 1151b, 1152a and 1152b that are 90 degrees out of phase. The outputs of the inverting and amplifying stage 1150A may be modeled as in equation (9)

$$S_{01} = \sin(\omega x)$$

$$S_{02} = \cos(\omega x)$$

$$S_{03} = -\sin(\omega x)$$

$$S_{04} = -\cos(\omega x) \quad (9)$$

Similarly, utilizing the trigonometry equations, as shown in equation (5), the differential circuits 1156-1159 in the differential stage 1150B may be configured to generate first stage signals 1156a-1159a and 1156b-1159b that are 45 degrees out of phase. A mathematical model for the first stage signals 1156a-1159a are as shown in equation (10). The first stage signals 1156a-1159a are similar to the first stage signals 751a-754a as shown in FIG. 7A.

$$\tfrac{1}{2} \times (S_{01} - S_{03}) = \sin(\omega x)$$

$$1/(\sqrt{2}) \times (S_{02} - S_{03}) = \sin(\omega x + \pi/4)$$

$$\tfrac{1}{2} \times (S_{02} - S_{04}) = \cos(\omega x)$$

$$1/(\sqrt{2}) \times (S_{02} - S_{01}) = \cos(\omega x + \pi/4) \quad (10)$$

As explained previously, although a specific combination of $S_{01}-S_{03}$, $S_{02}-S_{03}$, $S_{02}-S_{04}$, $S_{02}-S_{01}$ and specific constants $\{\tfrac{1}{2}, 1/(\sqrt{2}), \tfrac{1}{2}, 1/(\sqrt{2})\}$ may be selected for the embodiment shown in FIG. 11, other combinations may be possible, while still applying the principle as shown in equation (5) and the constants used may be adjusted accordingly.

Figure 12:
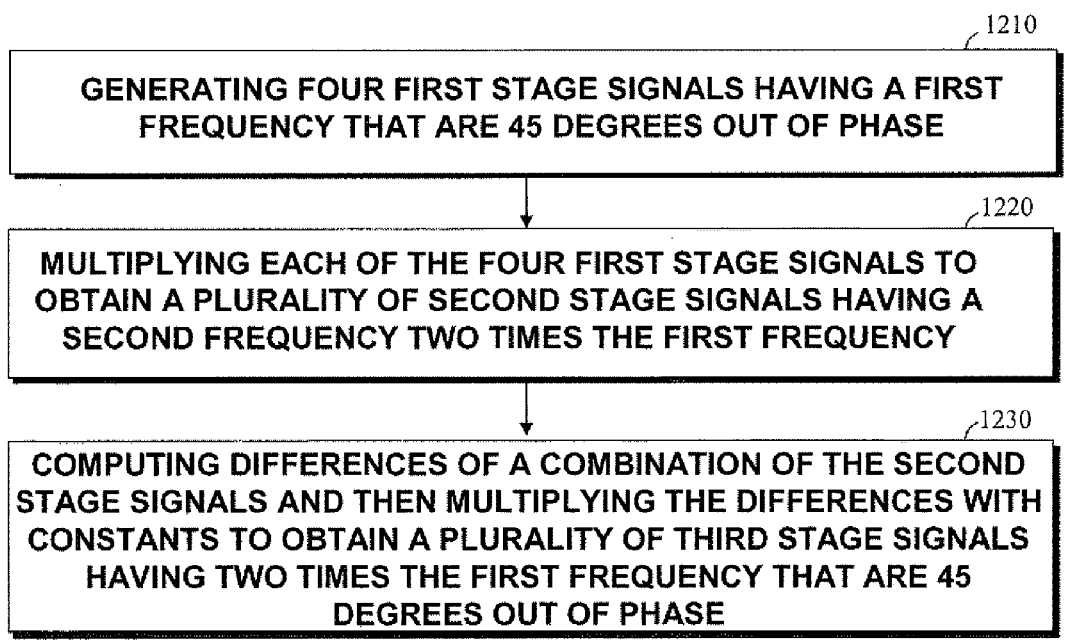
FIG. 12 illustrates a method for interpolating an encoded signal of an encoder starting from generating four 45 degrees out of phase signals.

FIG. 12 shows a flow chart illustrating a method for interpolating an encoded signal of an encoder having a coding member and at least four photo-detectors. In step 1210, four first stage signals having a first frequency that are 45 degrees out of phase are generated. This may include generating photo-signals using a light source and a coding member having light windows arranged in a specific manner, including the embodiment shown in FIGS. 5A-5B and FIG. 6. In another embodiment in which the photo-detector resides in another system, this may include amplifying four photo-signals having a first frequency that are 45 degrees out of phase into the four first stage signals. Step 1220 involves multiplying each of the four first stage signals to obtain a plurality of second stage signals having a second frequency two times the first frequency. As explained earlier, this may be done following the principles, as illustrated by the trigonometry equations shown in equation (5). In step 1230, differences of a selected combination of the second stage signals are computed and the results are multiplied with constants to obtain a plurality of third stage signals that are 45 degrees out of phase. In another embodiment, steps 1220 and 1230 may be repeated N times to obtain 2N stage signals and 2N+1 stage signals having a frequency $2^N$ times the first frequency. The 2N stage signals are 90 degrees out of phase, whereas the 2N+1 stage signals are 45 degrees out of phase. The 2N stage signals or 2N+1 stage signals may be compared to obtain two digital outputs that are 90 degrees out of phase, or may be amplified so that analog output signals may be obtained.

Figure 13:
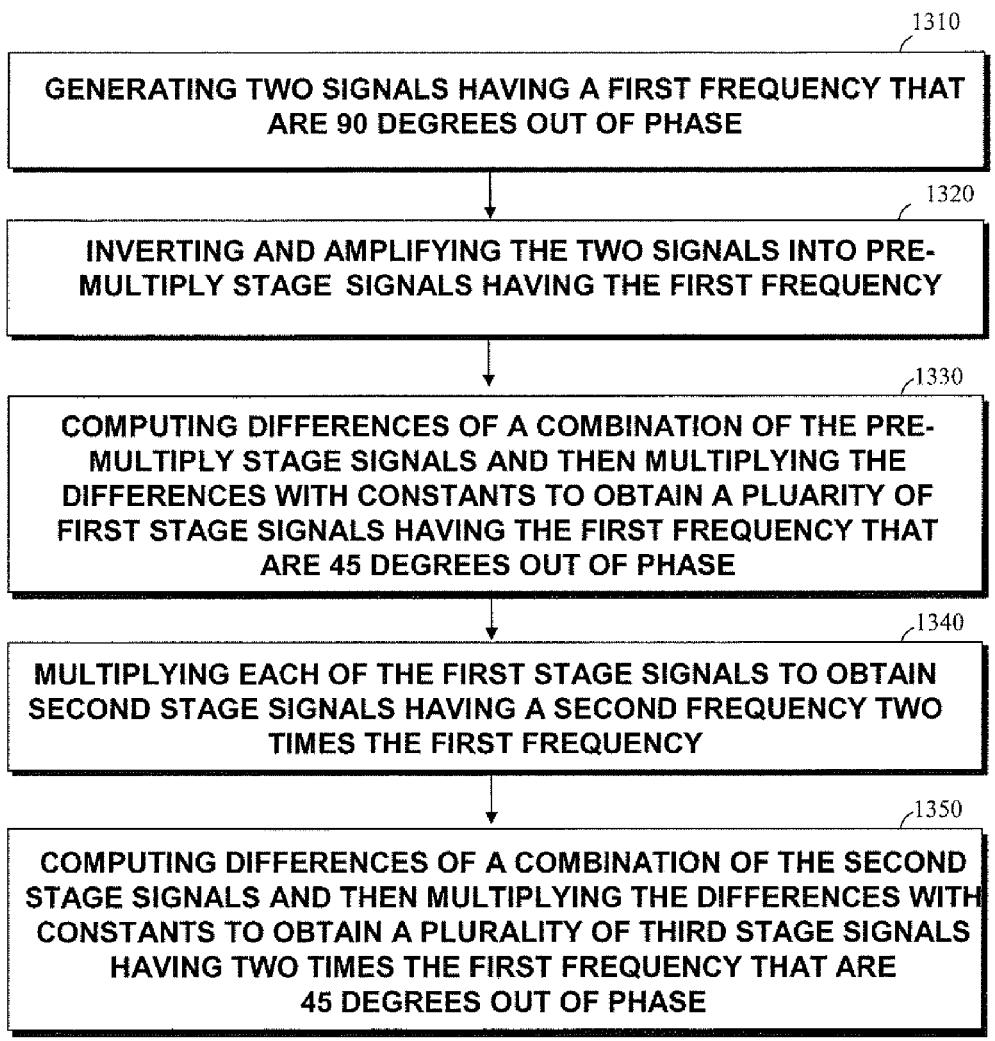
FIG. 13 illustrates a method for interpolating an encoded signal of an encoder starting from generating two 90 degrees out of phase signals.

FIG. 13 shows a flow chart depicting a method for interpolating an encoded signal of an encoder having a coding member and at least two photo-detectors. In step 1310, two signals having a first frequency that are 90 degrees out of phase are generated. This may include generating photo-signals using a light source and a coding member having light windows arranged in a specific manner to obtain photo-signals that are 90 degrees out of phase, including the embodiment shown in FIGS. 4A-4C. In another embodiment, this may include amplifying two photo-signals having a first frequency that are 90 degrees out of phase into the two signals. In step 1320, the two signals are inverted and amplified into a plurality of pre-multiply stage signals having the first frequency. In step 1330, differences of a selected combination of the pre-multiply stage signals may be computed and the results may be multiplied with constants to obtain a plurality of first stage signals that are 45 degrees out of phase having the first frequency. An example of this is shown in equation (10). This is followed by step 1340, which involves multiplying each of the four first stage signals to obtain a plurality of second stage signals having a second frequency two times the first frequency. As explained earlier, this may be done following the principles, as illustrated by the trigonometry equations shown in equation (5). In step 1350, differences of a selected combination of the second stage signals are computed and the results may be multiplied with constants to obtain a plurality of third stage signals that are 45 degrees out of phase. In another embodiment, steps 1340 and 1350 may be repeated N times to obtain 2N stage signals and 2N+1 stage signals having a frequency $2^N$ times the first frequency. The 2N stage signals are 90 degrees out of phase, whereas the 2N+1 stage signals are 45 degrees out of phase. The 2N stage signals or 2N+1 stage signals may be compared to obtain two digital output signals that are 90 degrees out of phase, or may be amplified so that analog output signal may be obtained.

Although specific embodiments of the invention have been described and illustrated, the invention is not to be limited to the specific forms or arrangements of parts so described and illustrated. In particular, the equations and the combinations of mathematical equations with respective constants are exemplary and for illustration only. Although circuit blocks in FIG. 7A and FIG. 11 are used, similar results may be obtained using digital processing circuits by converting all the signals into digital signals. It is to be understood that the illustration and description shall not be interpreted narrowly. The scope of the invention is to be defined by the claims appended hereto and their equivalents.

What is claimed is:

1. A method for interpolating an encoded signal of an encoder having a coding member configured to move in predetermined directions, and corresponding photo-detectors configured to generate photo-signals, the method comprising:
    generating four first stage signals having a first frequency that are 45 degrees out of phase;
    multiplying each of the four first stage signals to obtain a plurality of second stage signals having a second frequency two times the first frequency that are 90 degrees out of phase; and
    computing differences of a combination of the second stage signals, and multiplying the differences with constants, respectively, to obtain a plurality of third stage signals that are 45 degrees out of phase having the second frequency.

2. The method of claim 1 further comprising: repeating the steps of multiplying and computing differences for N times to obtain a plurality of 2N stage signals and 2N+1 stage signals, each step comprising:
    multiplying the plurality of 2N−1 stage signals (where N=2, 3, 4 . . . ) to obtain the plurality of 2N stage signals having $2^N$ times the first frequency that are 90 degrees out of phase; and
    computing differences of a combination of the 2N stage signals and multiplying the differences with constants, respectively, to obtain the plurality of 2N+1 stage signals having $2^N$ times the first frequency that are 45 degrees out of phase.

3. The method of claim 2 further comprising: comparing the 2N stage signals or the 2N+1 stage signals to obtain at least two digital output signals having $2^N$ times the first frequency that are 90 degrees out of phase.

4. The method of claim 2 further comprising: amplifying two of the 2N stage signals or the 2N+1 stage signals that are 90 degrees out of phase for use as analog interpolated outputs.

5. The method of claim 1, wherein the photo-signals are generated using a reticle comprising four groups of light windows positioned above the corresponding photo-detectors, and wherein the light windows in each group are displaced, such that the photo-signals generated by the photo-detectors are 45 degrees out of phase.

6. The method of claim 5, wherein the light windows in each group are arranged systematically in a plurality of columns and rows such that center of gravity for each group is positioned substantially overlapping each other.

7. The method of claim 1, wherein the four first stage signals are generated by amplifying four photo-signals that are 45 degrees out of phase.

8. The method of claim 1, wherein the four first stage signals are generated from two photo-signals 90 degrees out of phase comprising:
    inverting and amplifying two photo-signals into a plurality of pre-multiply stage signals that are 90 degrees out of phase; and
    computing differences of a combination of the pre-multiply stage signals and multiplying the differences with constants, respectively, to obtain the four first stage signals having the first frequency that are 45 degrees out of phase.

9. The method of claim 1, wherein the step of computing differences involves using at least one fully differential amplifier.

10. An interpolator for interpolating an encoded signal of an encoder having a coding member configured to move in predetermined directions, and corresponding photo-detectors configured to generate photo-signals, the interpolator comprising:
    a first stage amplifying circuit configured to amplify the photo-signals into a plurality of first stage signals having a first frequency that are 45 degrees out of phase;
    a second stage multiplier circuit configured to multiply the first stage signals to obtain a plurality of second stage signals having a second frequency two times the first frequency that are 90 degrees out of phase; and
    a third stage differential circuit configured to compute differences of a combination of the second stage signals, and multiply the differences with constants, respectively, to obtain a plurality of third stage signals that are 45 degrees out of phase having the second frequency.

11. The interpolator of claim 10, further comprising:
    a 2N (where N=2, 3, 4 . . . ) stage of multiplier circuit configured to multiply the 2N−1 stage signals to obtain a plurality of 2N stage signals having $2^N$ times the first frequency that are 90 degrees out of phase; and
    a 2N+1 stage of differential circuit configured to compute differences of a combination of the 2N stage signals and multiply the differences with constants, respectively, to obtain a plurality of 2N+1 stage signals having $2^N$ times the first frequency that are 45 degrees out of phase.

12. The interpolator of claim 11, further comprising: two comparators for comparing the 2N stage signals or the 2N+1 stage signals to obtain at least two digital output signals having $2^N$ frequency that are 90 degrees out of phase.

13. The interpolator of claim 11, further comprising: amplifying circuits configured to amplify two of the 2N stage signals or the 2N+1 stage signals that are 90 degrees out of phase for use as analog interpolated outputs.

14. An optical encoder, comprising:
    a light source configured to generate light;
    a coding member;
    a photo-detector array configured to receive light emitted through the coding member, wherein the photo-detector array is configured to generate a plurality of photo-signals having a first frequency;
    a first stage amplifying circuit configured to amplify the photo-signals into a plurality of first stage signals having the first frequency that are 45 degrees out of phase;
    a second stage multiplier circuit configured to multiply the first stage signals to obtain a plurality of second stage signals having a second frequency two times the first frequency that are 90 degrees out of phase; and,
    a third stage differential circuit configured to compute differences of a combination of the second stage signals, and multiply the differences with constants, respectively, to obtain a plurality of third stage signals that are 45 degrees out of phase.

15. The encoder of claim 14, further comprising:
a 2N (where N=2, 3, 4 . . . ) stage of multiplier circuit configured to multiply the 2N−1 stage signals to obtain a plurality of 2N stage signals having $2^N$ times the first frequency that are 90 degrees out of phase; and
a 2N+1 stage of differential circuit configured to compute differences of a combination of the 2N stage signals and multiply the differences with constants, respectively, to obtain a plurality of 2N+1 stage signals having $2^N$ times the first frequency that are 45 degrees out of phase.

16. The encoder of claim 15, further comprising: two comparators for comparing the 2N stage signals or the 2N+1 stage signals to obtain at least two digital output signals having $2^N$ frequency that are 90 degrees out of phase.

17. The encoder of claim 15, further comprising: amplifying circuits confiugred to amplify two of the 2N stage signals or the 2N+1 stage signals that are 90 degrees out of phase for use as analog interpolated outputs.

18. The encoder of claim 14, further comprising: a reticle having four groups of light windows positioned above the corresponding photo-detector array, and wherein the light windows in each group are displaced such that the photo-signals generated are 45 degrees out of phase.

19. The encoder of claim 18, wherein the light windows in each group are arranged systematically in a plurality of columns and rows, such that center of gravity for each group is positioned substantially overlapping each other.

20. The encoder of claim 14, wherein the encoder forms a portion of a motor control system.

* * * * *